US012075728B2

(12) United States Patent
Cook

(10) Patent No.: US 12,075,728 B2
(45) Date of Patent: Sep. 3, 2024

(54) LOCKING MECHANISM FOR AN AGRICULTURAL HEADER

(71) Applicant: CNH Industrial America LLC, New Holland, PA (US)

(72) Inventor: Joel Timothy Cook, Akron, PA (US)

(73) Assignee: CNH Industrial America LLC, New Holland, PA (US)

( * ) Notice: Subject to any disclaimer, the term of this patent is extended or adjusted under 35 U.S.C. 154(b) by 679 days.

(21) Appl. No.: 17/292,332

(22) PCT Filed: Oct. 22, 2019

(86) PCT No.: PCT/US2019/057455
§ 371 (c)(1),
(2) Date: May 7, 2021

(87) PCT Pub. No.: WO2020/101841
PCT Pub. Date: May 22, 2020

(65) Prior Publication Data
US 2021/0392816 A1 Dec. 23, 2021

Related U.S. Application Data

(60) Provisional application No. 62/768,189, filed on Nov. 16, 2018.

(51) Int. Cl.
*A01D 47/00* (2006.01)
*A01D 41/16* (2006.01)
*A01D 57/20* (2006.01)

(52) U.S. Cl.
CPC ............. *A01D 47/00* (2013.01); *A01D 41/16* (2013.01); *A01D 57/20* (2013.01)

(58) Field of Classification Search
CPC .... A01D 47/00; A01D 56/181; A01D 56/208; A01D 56/00
See application file for complete search history.

(56) References Cited

U.S. PATENT DOCUMENTS 1,858,618 A * 5/1932 Carlson ................. A01D 34/46
56/14.7
2,236,002 A * 3/1941 Lederer ................. A01D 41/02
56/16.5

(Continued)

FOREIGN PATENT DOCUMENTS

BR 102012027195 A2 * 2/2014 ............. A01D 41/14
BR 112021009457 A2 * 8/2021 ........... A01D 41/127

(Continued)

OTHER PUBLICATIONS

International Search Report for PCT application PCT/US2019/057455, mailed Jan. 29, 2020 (12 pages).

*Primary Examiner* — Alicia Torres
*Assistant Examiner* — Ashley A Kaercher
(74) *Attorney, Agent, or Firm* — Peter K. Zacharias; Rebecca L. Henkel; Rickard K. DeMille

(57) ABSTRACT

A locking mechanism for an agricultural header includes a rod that extends laterally along the header and a hook coupled to the rod. The rod is configured to rotate in a first direction to transition the locking mechanism to a first position and rotate in a second direction, opposite the first direction, to transition the locking mechanism to a second position. The hook is configured to engage an arm of the header. The arm is configured to support a cutter bar assembly of the header and is configured to rotate about a pivot joint relative to a frame of the header. The rod is configured to rotate in the first direction to engage the hook with the arm to block rotation of the respective arm, and the rod is configured to rotate in the second direction to disengage the hook from the respective arm to enable rotation of the arm.

20 Claims, 8 Drawing Sheets

(56) References Cited

U.S. PATENT DOCUMENTS

| | | | | |
|---|---|---|---|---|
| 2,636,331 A * | 4/1953 | Price | A01D 47/00 | 56/238 |
| 2,821,061 A * | 1/1958 | Pilcher | A01D 41/10 | 56/364 |
| 3,363,892 A * | 1/1968 | Takahashi | A01D 34/475 | 267/169 |
| 3,964,603 A * | 6/1976 | Sandler | A47F 7/024 | 206/566 |
| 3,981,125 A * | 9/1976 | Kerber | A01D 41/14 | 56/208 |
| 4,091,602 A * | 5/1978 | Williams | A01D 41/141 | 56/11.1 |
| 4,204,383 A * | 5/1980 | Milliken, Jr. | A01D 57/00 | 56/DIG. 15 |
| 4,343,140 A * | 8/1982 | Hegger | A01D 41/14 | 56/DIG. 15 |
| 5,661,964 A * | 9/1997 | Paulson | A01D 45/021 | 56/109 |
| 6,050,075 A * | 4/2000 | Waldrop | A01D 89/005 | 56/364 |
| 6,116,008 A * | 9/2000 | Digman | A01D 61/008 | 56/15.8 |
| 6,336,314 B1 * | 1/2002 | Crevier | A01D 7/10 | 294/50.8 |
| 6,782,683 B2 * | 8/2004 | Buermann | A01D 41/14 | 56/257 |
| 7,467,506 B2 * | 12/2008 | Lovett | A01D 41/14 | 56/15.8 |
| 7,802,417 B2 * | 9/2010 | Sauerwein | A01D 41/14 | 56/181 |
| 7,886,512 B2 * | 2/2011 | Lohrentz | A01D 57/20 | 56/181 |
| 7,992,374 B1 * | 8/2011 | Bich | A01D 41/141 | 56/208 |
| 9,750,187 B2 * | 9/2017 | Walker | A01D 45/023 | |
| 10,568,263 B2 * | 2/2020 | Cook | A01D 57/03 | |
| 10,920,851 B1 * | 2/2021 | Cook | F16G 3/10 | |
| 10,945,370 B2 * | 3/2021 | Vandeven | A01D 41/14 | |
| 11,516,964 B2 * | 12/2022 | Brimeyer | A01D 41/145 | |
| 11,559,000 B2 * | 1/2023 | Brimeyer | A01D 41/141 | |
| 11,617,300 B2 * | 4/2023 | Noll | A01D 67/00 | 74/48 |
| 11,778,943 B2 * | 10/2023 | Brimeyer | F16H 25/14 | 56/296 |
| 2004/0221561 A1 * | 11/2004 | Koehn | A01D 34/662 | 56/15.9 |
| 2006/0123764 A1 * | 6/2006 | McLean | A01D 43/04 | 56/350 |
| 2007/0012008 A1 * | 1/2007 | Fackler | A01D 41/14 | 56/3 |
| 2008/0184690 A1 * | 8/2008 | Poulson | A01D 41/14 | 700/13 |
| 2017/0127612 A1 * | 5/2017 | Fay, II | A01B 59/064 | |
| 2018/0139899 A1 * | 5/2018 | Shearer | A01D 41/14 | |
| 2019/0183049 A1 * | 6/2019 | Cook | A01D 43/107 | |
| 2020/0217104 A1 * | 7/2020 | Hunt | A01D 75/20 | |
| 2020/0315096 A1 * | 10/2020 | Thomas | A01D 75/187 | |
| 2021/0037712 A1 * | 2/2021 | Sorensen | A01B 63/04 | |
| 2021/0120741 A1 * | 4/2021 | Sorensen | A01D 41/06 | |
| 2021/0144921 A1 * | 5/2021 | Shane | A01D 45/021 | |
| 2021/0163229 A1 * | 6/2021 | Cook | A01D 43/06 | |
| 2021/0185875 A1 * | 6/2021 | Noll | A01D 41/14 | |
| 2021/0212254 A1 * | 7/2021 | Thomas | A01B 73/00 | |
| 2021/0274706 A1 * | 9/2021 | Cook | A01D 34/28 | |
| 2021/0274710 A1 * | 9/2021 | Todderud | A01D 57/025 | |
| 2021/0392816 A1 * | 12/2021 | Cook | A01D 47/00 | |
| 2022/0000019 A1 * | 1/2022 | Kemmerer | A01D 34/40 | |
| 2022/0000022 A1 * | 1/2022 | Kemmerer | A01D 41/14 | |
| 2022/0015292 A1 * | 1/2022 | Kemmerer | A01D 41/141 | |
| 2022/0322598 A1 * | 10/2022 | Hunt | A01D 41/14 | |
| 2023/0022413 A1 * | 1/2023 | Modak | A01D 34/04 | |
| 2023/0030953 A1 * | 2/2023 | Oberlander | A01B 59/002 | |
| 2023/0034156 A1 * | 2/2023 | Bietz | F15B 20/004 | |
| 2023/0076930 A1 * | 3/2023 | Modak | A01D 34/28 | |
| 2023/0309441 A1 * | 10/2023 | Thomas | G01L 1/2206 | 56/10.2 A |
| 2023/0363306 A1 * | 11/2023 | Cook | A01D 34/243 | |
| 2023/0403977 A1 * | 12/2023 | Noll | A01D 41/14 | |

FOREIGN PATENT DOCUMENTS

| | | | | |
|---|---|---|---|---|
| CA | 2996343 A1 * | 8/2019 | | A01D 34/008 |
| CA | 3111071 A1 * | 9/2021 | | A01B 73/042 |
| CA | 3119684 A1 * | 11/2021 | | A01D 41/141 |
| CA | 3120065 A1 * | 11/2021 | | A01D 34/04 |
| CN | 102065675 * | 5/2011 | | |
| CN | 102065675 A * | 5/2011 | | A01D 41/14 |
| CN | 102083301 A * | 6/2011 | | A01D 34/13 |
| CN | 101743801 B * | 7/2012 | | A01D 41/14 |
| CN | 105557191 A * | 5/2016 | | A01D 45/02 |
| CN | 103732052 B * | 4/2017 | | A01D 41/14 |
| CN | 106576622 A * | 4/2017 | | A01D 41/12 |
| CN | 107347379 A * | 11/2017 | | A01D 47/00 |
| CN | 109156167 A * | 1/2019 | | A01D 47/00 |
| CN | 109168596 A * | 1/2019 | | A01B 73/00 |
| CN | 109964621 A * | 7/2019 | | A01D 41/02 |
| CN | 110169260 A * | 8/2019 | | A01D 43/0633 |
| CN | 111837605 A * | 10/2020 | | A01D 41/14 |
| CN | 112385392 A * | 2/2021 | | A01D 45/065 |
| CN | 112840835 A * | 5/2021 | | A01D 41/06 |
| CN | 112840837 A * | 5/2021 | | A01D 41/06 |
| CN | 112889482 A * | 6/2021 | | A01D 43/086 |
| CN | 112930849 A * | 6/2021 | | A01D 43/086 |
| CN | 113383643 A * | 9/2021 | | A01B 73/042 |
| CN | 113396688 A * | 9/2021 | | |
| CN | 115474475 A * | 12/2022 | | |
| CN | 116138043 A * | 5/2023 | | |
| DE | 102007005596 A1 * | 8/2008 | | A01B 59/064 |
| DE | 102021112590 A1 * | 12/2021 | | A01D 34/24 |
| EP | 701771 A1 * | 3/1996 | | A01B 73/046 |
| EP | 1092341 A1 * | 4/2001 | | A01D 41/16 |
| EP | 1095550 A1 * | 5/2001 | | A01B 73/005 |
| EP | 2995188 A1 * | 3/2016 | | A01D 34/00 |
| EP | 3598881 A1 * | 1/2020 | | A01B 63/008 |
| EP | 3597025 B1 * | 3/2021 | | A01D 34/04 |
| RU | 2719182 C1 * | 4/2020 | | A01B 59/064 |
| WO | 2009/136272 A1 | 11/2009 | | |
| WO | WO-2015182195 A1 * | 12/2015 | | A01D 34/24 |
| WO | WO-2020101841 A1 * | 5/2020 | | A01D 41/14 |
| WO | WO-2020101855 A1 * | 5/2020 | | A01D 41/14 |
| WO | WO-2020101860 A1 * | 5/2020 | | A01D 41/06 |
| WO | WO-2020131226 A1 * | 6/2020 | | A01D 41/14 |
| WO | WO-2020154644 A1 * | 7/2020 | | A01D 41/144 |
| WO | WO-2022020451 A1 * | 1/2022 | | A01D 34/04 |
| WO | WO-2023018687 A1 * | 2/2023 | | |
| WO | WO-2023018690 A1 * | 2/2023 | | |

* cited by examiner

LOCKING MECHANISM FOR AN AGRICULTURAL HEADER

BACKGROUND

The present disclosure relates generally to a locking mechanism for an arm of an agricultural header.

A harvester may be used to harvest agricultural crops, such as barley, beans, beets, carrots, corn, cotton, flax, oats, potatoes, rye, soybeans, wheat, or other plant crops. Furthermore, a combine (e.g., combine harvester) is a type of harvester generally used to harvest certain crops that include grain (e.g., barley, corn, flax, oats, rye, wheat, etc.). During operation of a combine, the harvesting process may begin by removing a portion of each crop from a field, such as by using a header. The header may cut the agricultural crops and may transport the cut crops to a processing system of the combine.

Certain headers include a cutter bar assembly configured to cut a portion of each crop (e.g., a stalk), thereby separating the cut crop from the soil. The cutter bar assembly may extend along a substantial portion of the width of the header at a forward end of the header. In addition, the cutter bar assembly may include a cutter bar, a stationary blade assembly, and a moving blade assembly. The moving blade assembly may be fixed to the cutter bar, and the cutter bar/moving blade assembly may be driven to oscillate relative to the stationary blade assembly. Each blade assembly may include multiple blades distributed along the width of the respective blade assembly. As the moving blade assembly is driven to oscillate, the blades of the moving blade assembly move relative to the blades of the stationary blade assembly. As the header is moved through the field by the harvester, a portion of a crop (e.g., the stalk) may enter a gap between adjacent blades of the stationary blade assembly and a gap between adjacent blades of the moving blade assembly. Movement of the moving blade assembly causes a blade of the moving blade assembly to move across the gap in the stationary blade assembly, thereby cutting the portion of the crop.

Certain cutter bar assemblies are flexible along the width of the header. Such a cutter bar assembly may be supported by multiple longitudinally extending arms distributed along the width of the header. Each arm may be pivotally mounted to a frame of the header, thereby enabling the cutter bar assembly to flex during operation of the harvester. The flexible cutter bar assembly may follow the contours of the field, thereby enabling the cutting height to be substantially constant along the width of the header. However, if a substantially rigid cutter bar is desired (e.g., for certain field conditions, for harvesting certain types of crops, etc.), the pivoting movement of each arm may be blocked, thereby substantially reducing the flexibility of the cutter bar assembly. For example, a pin may be inserted through an opening in an arm and through a corresponding opening in the header frame, thereby blocking pivoting movement of the arm. Unfortunately, the process of aligning the opening of each arm with the corresponding opening in the header frame to facilitate insertion of the pin may be difficult and time consuming. Further, manual lifting of each arm or of the cutter bar assembly to a desired position may be difficult. As a result, the harvesting process may be significantly delayed if a transition between a flexible cutter bar assembly and a rigid cutter bar assembly is desired, thereby reducing the efficiency of the harvesting process.

BRIEF DESCRIPTION

Certain embodiments commensurate in scope with the disclosed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In certain embodiments, a locking mechanism for an agricultural header includes a rod that extends laterally along the header and a hook coupled to the rod. The rod is configured to rotate in a first direction to transition the locking mechanism to a first position and rotate in a second direction, opposite the first direction, to transition the locking mechanism to a second position. The hook is configured to engage an arm of the header. The arm is configured to support a cutter bar assembly of the header and is configured to rotate about a pivot joint relative to a frame of the header. The rod is configured to rotate in the first direction to engage the hook with the arm to block rotation of the respective arm, and the rod is configured to rotate in the second direction to disengage the hook from the respective arm to enable rotation of the arm.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Figure 1:
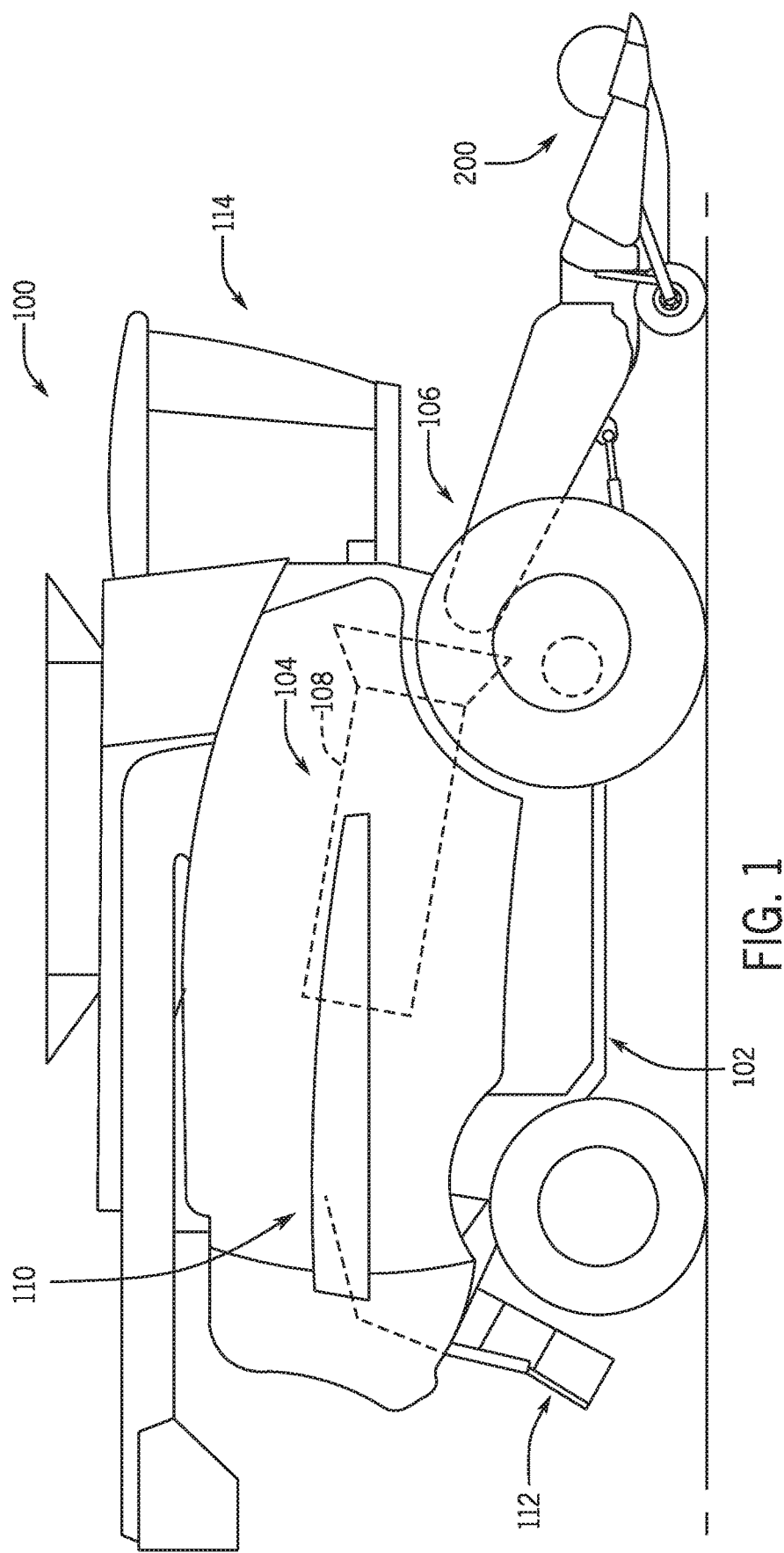
FIG. 1 is a side view of an embodiment of an agricultural harvester having a header.

Turning to the drawings, FIG. 1 is a side view of an embodiment of an agricultural harvester 100 having a header 200. The harvester 100 includes a chassis 102 configured to support the header 200 and an agricultural crop processing system 104. As described in greater detail below, the header 200 is configured to cut crops and to transport the cut crops toward an inlet 106 of the agricultural crop processing system 104 for further processing of the cut crops. The agricultural crop processing system 104 receives the cut crops from the header 200 and separates desired crop material from crop residue. For example, the agricultural crop processing system 104 may include a thresher 108 having a cylindrical threshing rotor that transports the crops in a helical flow path through the harvester 100. In addition to transporting the crops, the thresher 108 may separate certain desired crop material (e.g., grain) from the crop residue, such as husks and pods, and may enable the desired crop material to flow into a cleaning system located beneath the thresher 108. The cleaning system may remove debris from the desired crop material and may transport the desired crop material to a storage compartment within the harvester 100. The crop residue may be transported from the thresher 108 to a crop residue handling system 110, which may remove the crop residue from the harvester 100 via a crop residue spreading system 112 positioned at the aft end of the harvester 100.

In certain embodiments, the header 200 includes a cutter bar assembly configured to cut a portion of each crop (e.g., a stalk), thereby separating the cut crop from the soil. The cutter bar assembly may be flexible laterally along the header 200. The cutter bar assembly may be supported by multiple longitudinally extending arms distributed along the width of the header 200. Each arm may be pivotally mounted to a frame of the header 200, thereby enabling the cutter bar assembly to flex during operation of the harvester 100. The flexible cutter bar assembly may follow the contours of the field, thereby enabling the cutting height to be substantially constant laterally along the header 200. However, if a substantially rigid cutter bar is desired (e.g., for certain field conditions, for harvesting certain types of crops, etc.), the pivoting movement of each arm may be blocked, thereby substantially reducing the flexibility of the cutter bar assembly.

For example, the header 200 may include a locking mechanism configured to transition between a locked position and an unlocked position. The locking mechanism may include a rod disposed along the width of the header and hooks extending outwardly from the rod. Each hook may engage a respective arm at an end of the arm opposite an end coupled to the cutter bar assembly. The engagement of the hooks with the respective arms locks the cutter bar assembly in the substantially rigid configuration. The rod is configured to rotate to engage and disengage the hooks with the arms. As such, to transition between the substantially rigid and the flexible cutter bar configurations, the locking mechanism may transition from a locked position with the hooks engaged with the arms to the unlocked position with the hooks disengaged from the arms via rotation of the rod.

As illustrated, the harvester 100 includes a cab 114 configured to house an operator. The cab 114 may include certain controls configured to operate the locking mechanism. For example, the controls within the cab 114 may be mechanically coupled to the rod of the locking mechanism and may be configured to rotate the rod to transition the locking mechanism from the locked position to the unlocked position, and vice versa. In certain embodiments, the controls may include a user interface communicatively coupled to a motor and/or actuator. The motor and/or actuator may be configured to rotate the rod to transition the locking mechanism from the locked position to the unlocked position, and vice versa. The operator may interact with the user interface to cause the motor and/or actuator to rotate the rod to transition the locking mechanism. As such, the operator may operate the locking mechanism while positioned within the cab 114.

Figure 2:
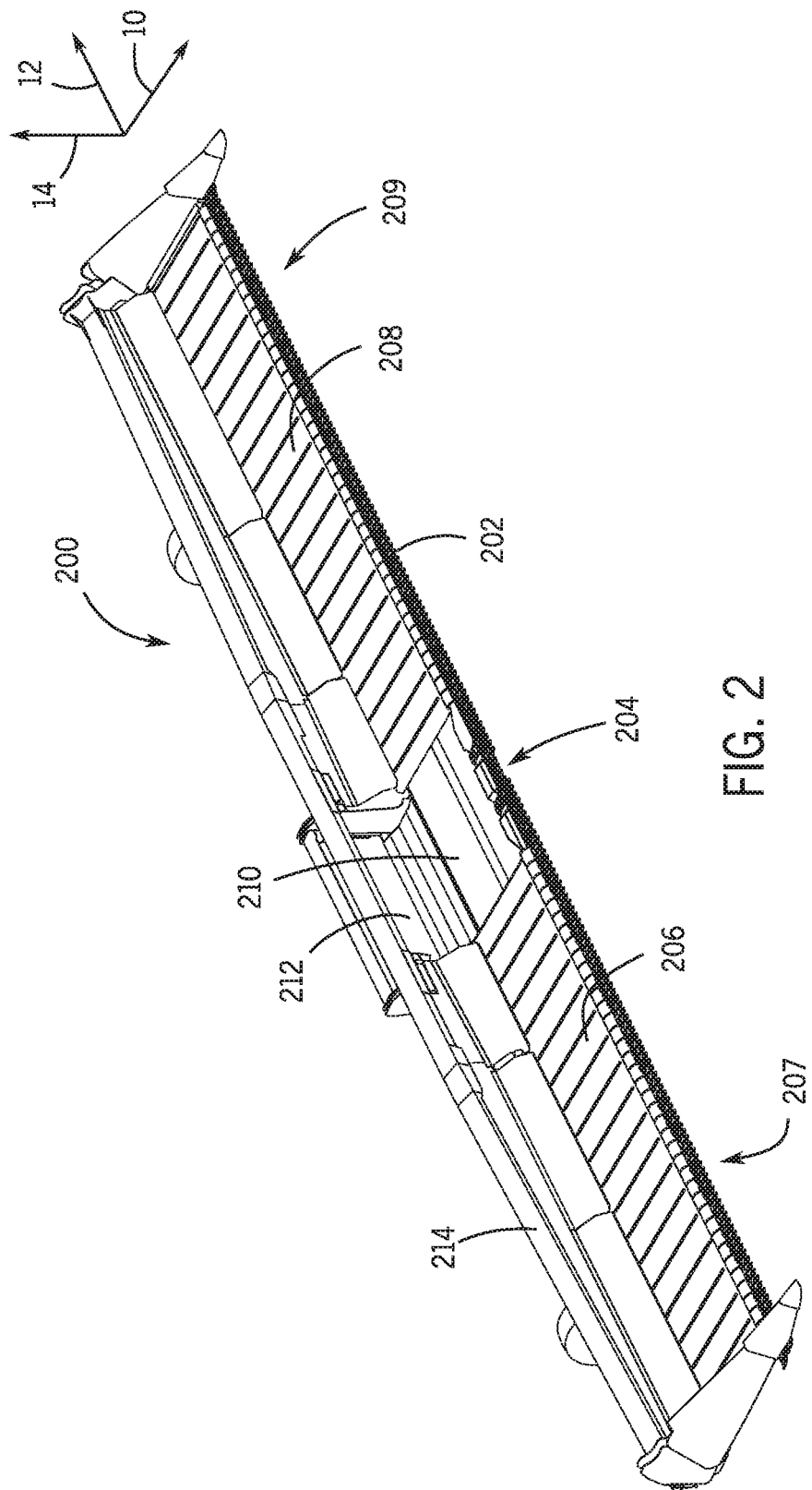
FIG. 2 is a perspective view of an embodiment of a header that may be employed within the agricultural harvester of FIG. 1.

FIG. 2 is a perspective view of an embodiment of a header 200 that may be employed within the agricultural harvester of FIG. 1. In the illustrated embodiment, the header 200 includes a cutter bar assembly 202 configured to cut a portion of each crop (e.g., a stalk), thereby separating the crop from the soil. The cutter bar assembly 202 is positioned at a forward end of the header 200 relative to a longitudinal axis 10 of the header 200. As illustrated, the cutter bar assembly 202 extends along a substantial portion of the width of the header 200 (e.g., the extent of the header 200 along a lateral axis 12). As discussed in detail below, the cutter bar assembly 202 includes a cutter bar, a stationary blade assembly, and a moving blade assembly. The moving blade assembly may be fixed to the cutter bar (e.g., above the cutter bar relative to a vertical axis 14 of the header 200), and the cutter bar/moving blade assembly may be driven to oscillate relative to the stationary blade assembly. In the illustrated embodiment, the cutter bar/moving blade assembly is driven to oscillate by a driving mechanism 204 positioned at the lateral center of the header 200. However, in other embodiments, the cutter bar/moving blade assembly may be driven by another suitable mechanism (e.g., located at any suitable position on the header 200). As the harvester is driven through a field, the cutter bar assembly 202 engages crops within the field, and the moving blade assembly cuts the crops (e.g., the stalks of the crops) in response to the engagement of the cutter bar assembly 202 with the crops.

In the illustrated embodiment, the header 200 includes a first lateral belt 206 on a first lateral side 207 of the header 200 and a second lateral belt 208 on a second lateral side 209 of the header 200, opposite the first lateral side 207. Each belt is driven to rotate by a suitable drive mechanism, such as an electric motor or a hydraulic motor. The first lateral belt 206 and the second lateral belt 208 are driven such that the top surface of each belt moves laterally inward along the lateral axis 12. In addition, the header 200 includes a longitudinal belt 210 positioned between the first lateral belt 206 and the second lateral belt 208 along the lateral axis 12. The longitudinal belt 210 is driven to rotate by a suitable drive mechanism, such as an electric motor or a hydraulic motor. Additionally, the longitudinal belt 210 is driven such that the top surface of the longitudinal belt 210 moves rearwardly along the longitudinal axis 10. In certain embodiments, the crops cut by the cutter bar assembly 202 are directed toward the belts by a reel assembly. Agricultural crops that contact the top surface of the first lateral belt 206 and the second lateral belt 208 are driven laterally inwardly to the longitudinal belt due to the movement of the lateral belts. In addition, agricultural crops that contact the longitudinal belt 210 and the agricultural crops provided to the longitudinal belt 210 by the first lateral belt 206 and the second lateral belt 208 are driven rearwardly along the longitudinal axis 10 due to the movement of the longitudinal belt 210. Accordingly, the belts move the cut agricultural product through an opening 212 in the header 200 to the inlet of the agricultural crop processing system.

In the illustrated embodiment, the cutter bar assembly 202 is flexible along the width of the header 200 (e.g., the extent of the header 200 along the lateral axis 12). As discussed in detail below, the cutter bar assembly 202 is supported by multiple arms extending along the longitudinal axis 10 and distributed along the width of the header 200 (e.g., along the lateral axis 12 of the header 200). Each arm is mounted to a frame 214 of the header and is configured to rotate about a pivot joint relative to the frame 214. As a result, the cutter bar assembly 202 may flex during operation of the harvester. The flexible cutter bar assembly 202 may follow the contours of the field, thereby enabling the cutting height to be substantially constant along the width of the header 200 (e.g., the extent of the header 200 along the lateral axis 12). However, if a substantially rigid cutter bar assembly 202 is desired (e.g., for certain field conditions, for harvesting certain types of crops, etc.), the pivoting movement of the arms may be blocked by the locking mechanism described herein, thereby substantially reducing the flexibility of the cutter bar assembly 202 (e.g., transitioning the cutter bar assembly to a substantially rigid configuration).

Figure 3:
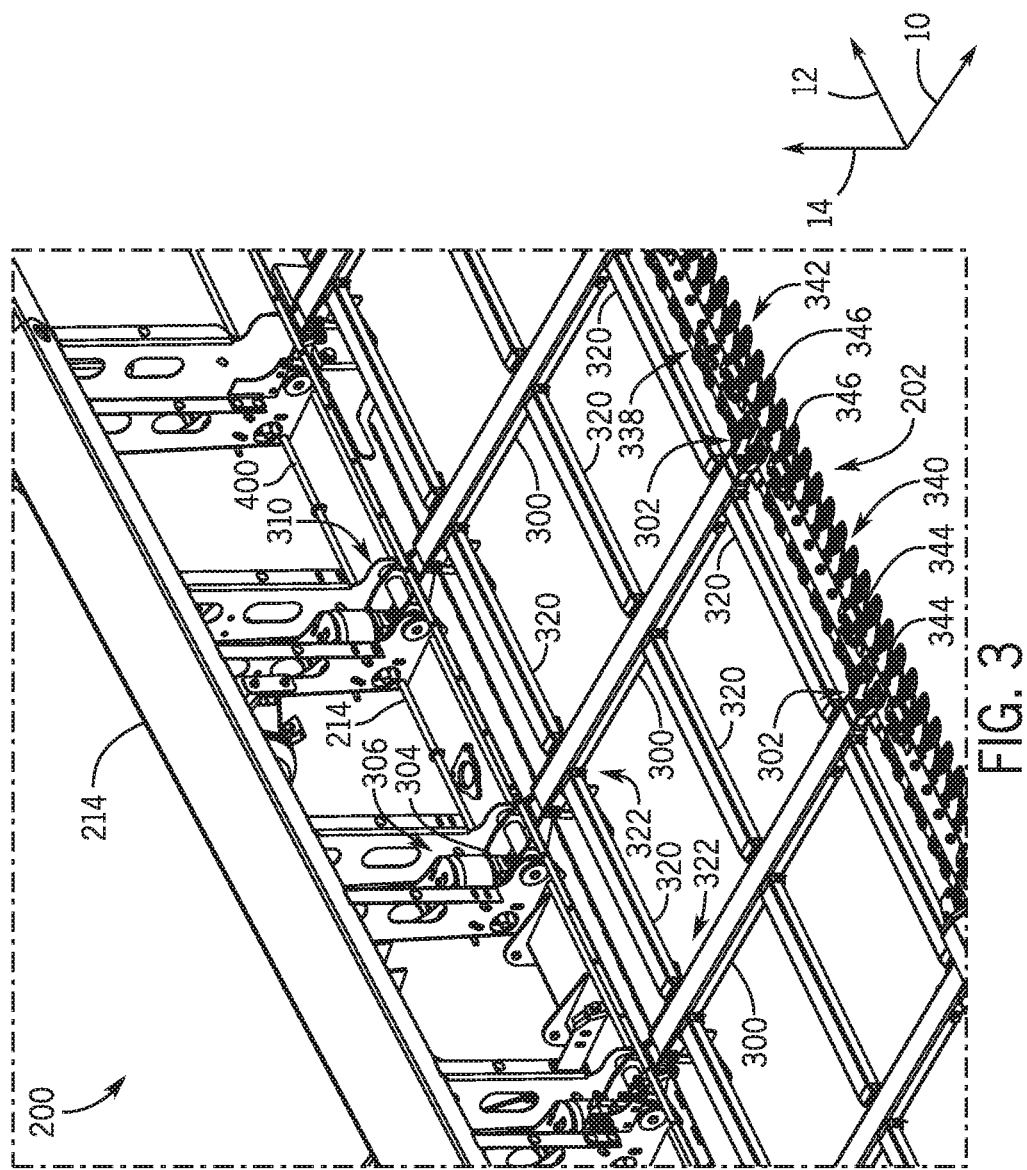
FIG. 3 is a perspective view of a portion of the header of FIG. 2, including a cutter bar assembly and arms that support the cutter bar assembly.

FIG. 3 is a perspective view of a portion of the header 200 of FIG. 2, including the cutter bar assembly 202 and arms 300 that support the cutter bar assembly 202. As illustrated, the lateral belt (e.g., the first lateral belt or the second lateral belt) and certain panels of the header 200 are omitted from FIG. 3 to better illustrate the arms 300 and certain other portions of the header 200. The arms 300 extend along the longitudinal axis 10 and are distributed along the lateral axis 12. Each arm 300 includes a first end 302 coupled to the cutter bar assembly 202 and a second end 304 coupled to an airbag system 306. Further, each arm 300 is pivotally coupled to the frame 214 of the header 200 at a pivot joint 310 of the arm 300. The pivot joint 310 is located between the first end 302 and the second end 304. Each arm 300 is configured to pivot about the pivot joint 310 to enable the lateral belt and the cutter bar assembly 202 to flex in response to variations in the terrain. As each arm 300 pivots, the airbag system 306 is configured to urge the first end 302 upward to enable the cutter bar assembly 202 to follow the contour of the terrain. The airbag system 306 is also configured to absorb energy associated with the arm 300 pivoting. The pivot joint 310 is located significantly closer to the second end 304 than the first end 302 of each arm 300. As such, a weight of the respective lateral belt, the cutter bar assembly 202, and the arm 300 on the side of the pivot joint 310 adjacent to the cutter bar assembly 202 (e.g., toward the first end 302) is significantly greater than a weight of the arm 300 on the side of the pivot joint 310 adjacent to the airbag system 306 (e.g., toward the second end 304). Due to the weight difference, the second end 304 of each arm 300 is biased upwardly toward the airbag system 306.

As illustrated, the header 200 includes lateral supports 320 coupled to the arms 300. Each lateral support 320 is coupled to two arms 300 at lateral support ends 322. The arms 300 and the lateral supports 320 may be disposed within and may extend through a respective lateral belt of the header 200. For example, the lateral belt may rotate around the arms 300 and the lateral supports 320 during operation of the header 200. The lateral supports 320 are configured to rotate relative to the arms 300 at the lateral support ends 322 to enable the lateral belt and the cutter bar assembly 202 to flex.

The cutter bar assembly 202 is configured to cut a portion of each crop (e.g., a stalk), thereby separating the crop from the soil. In the illustrated embodiment, the cutter bar assembly 202 includes a cutter bar 338, a moving blade assembly 340, and a stationary blade assembly 342. The moving blade assembly 340 is coupled to the cutter bar 338 (e.g., above the cutter bar 338 relative to the vertical axis 14 of the header 200), and the moving blade assembly 340 is driven to oscillate relative to the stationary blade assembly 342. The moving blade assembly 340 includes moving blades 344, and the stationary blade assembly 342 includes stationary blades 346. As the harvester is driven through a field, the moving blades 344 and the stationary blades 346 engage crops within the field as the moving blade assembly 340 oscillates, and the moving blade assembly 340 cuts the crops (e.g., the stalks of the crops) in response to the engagement with the crops.

As described herein, the cutter bar assembly 202 is configured to flex. For example, while the header 200 traverses the field, the cutter bar assembly 202 may generally flex to match the contour of the field. The cutter bar assembly 202 may flex while cutting crops (e.g., which the moving blade assembly 340 cuts the crops). The arms 300 are configured to pivot about the pivot joints 310 to enable the cutter bar assembly 202 to flex. However, in certain situations, an operator may desire the cutter bar assembly 202 to be rigid. As such, the header 200 includes a locking mechanism 400 configured to transition the cutter bar assembly 200 between a flexible configuration and a substantially rigid configuration. In the rigid configuration, the locking mechanism 400 is in a locked position and is configured to block rotation of the arms 300 about the pivot joints 310. By blocking the rotation of the arms 300, the cutter bar assembly 202 is maintained in the substantially rigid configuration. As illustrated, the locking mechanism 400 is disposed along a rear portion of the header 200.

Figure 4:
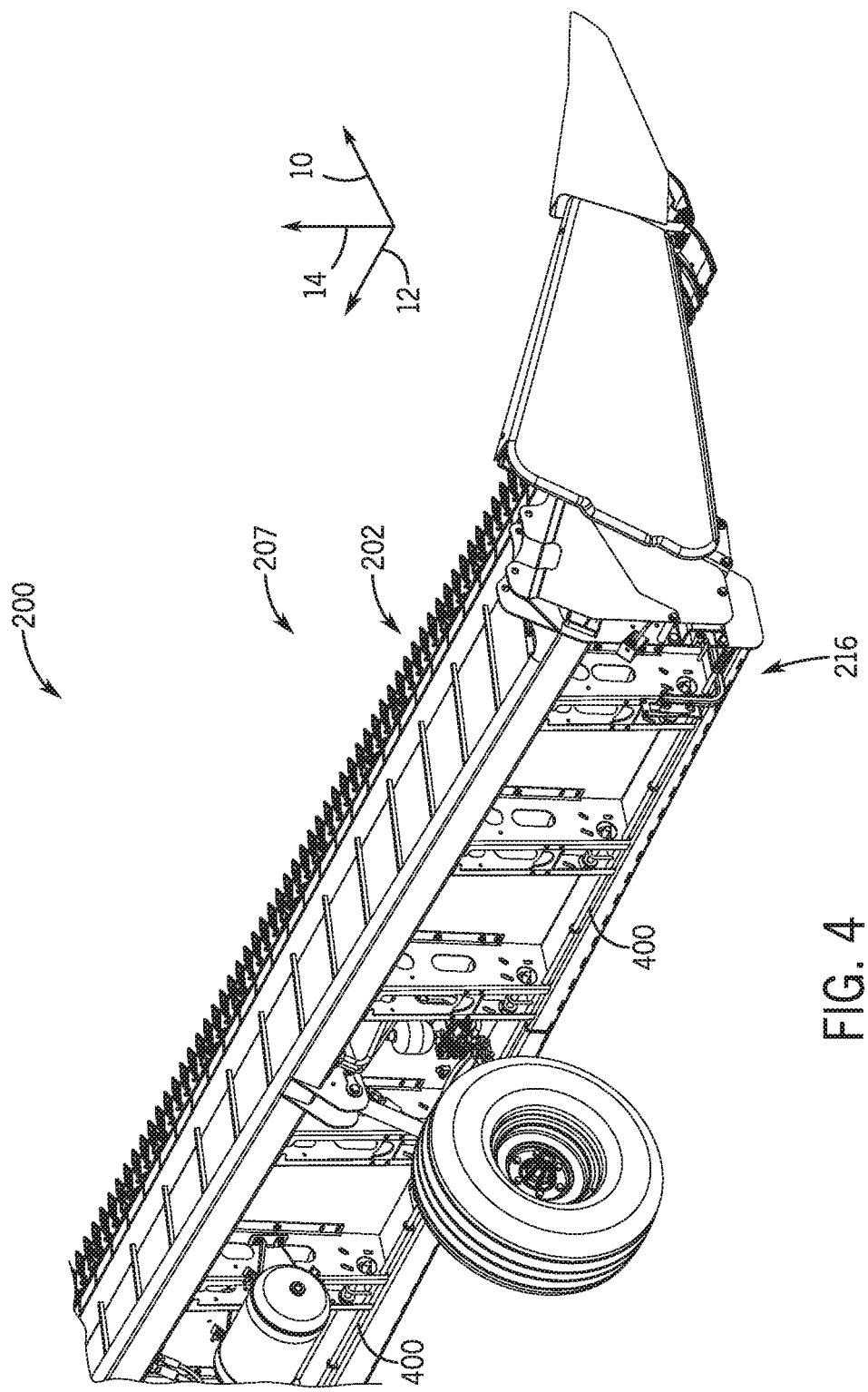
FIG. 4 is a rear perspective view of a portion of the header of FIG. 2, including a locking mechanism configured to selectively block rotation of the arms.

FIG. 4 is a rear perspective view of a portion of the header 200 of FIG. 2, including the locking mechanism 400 configured to selectively block rotation of the arms. As illustrated, the locking mechanism 400 extends generally along the lateral axis 12 and is disposed at a rear portion 216 of the header 200. Additionally, the locking mechanism 400 is disposed on the first lateral side 207 of the header 200 and is configured to selectively block rotation of the arms disposed along the first lateral side 207. In certain embodiments, the second lateral side of the header 200 may include a second and independent locking mechanism that may be substantially similar to the locking mechanism 400. For example, the second locking mechanism may be disposed along the second lateral side of the header 200 and may be configured to selectively block rotation of the arms disposed along the second lateral side by engaging and disengaging the arms. In some embodiments, the header 200 may include a single locking mechanism that extends along a substantial portion of the width of the header 200 such that the single locking mechanism may selectively block rotation of all arms of the header 200.

The locking mechanism 400 is configured to transition to engage the arms of the header 200 to block the arms from rotating and to disengage the arms to enable the arms to rotate. While the locking mechanism 400 is in the locked state, the arms are substantially blocked from rotating about the pivot joints, and the cutter bar assembly 202 is in a substantially rigid configuration. While the locking mechanism 400 is in the unlocked state, the arms are not blocked by the locking mechanism 400 and are able to rotate about the respective pivot joints. While the locking mechanism 400 is in the unlocked state, the cutter bar assembly 202 is in a flexible configuration.

Figure 5:
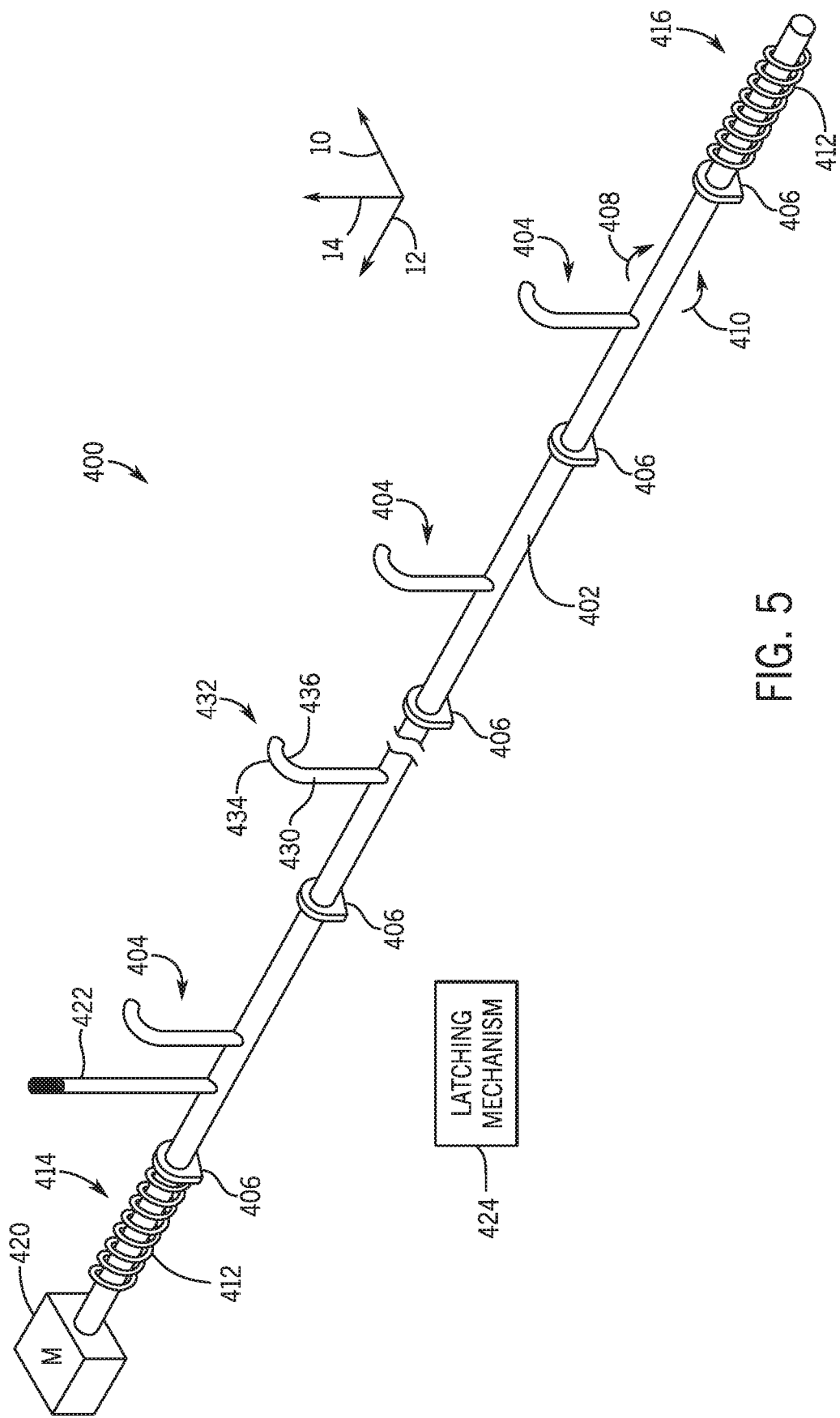
FIG. 5 is a perspective view of the locking mechanism of FIG. 4.

FIG. 5 is a perspective view of the locking mechanism 400 of FIG. 4. As illustrated, the locking mechanism 400 includes a rod 402 and hooks 404. The rod 402 extends generally along the lateral axis 12. For example, the rod 402 may extend laterally along the header. The hooks 404 extend from the rod 402 and are generally perpendicular to the rod 402. As illustrated, the locking mechanism 400 includes mounting brackets 406 that may be rigidly coupled to the frame of the header (e.g., directly to the header frame). The rod 402 is rotatably coupled to the mounting brackets 406. Additionally, the rod 402 is configured to rotate in a first direction 408 to transition the locking mechanism 400 to a locked position and in a second direction 410 to transition the locking mechanism 400 to an unlocked position. The locking mechanism 400 further includes biasing elements 412 disposed generally at a first end 414 of the rod 402 and at a second end 416 of the rod 402. The biasing elements 412 are configured to bias the rod 402 in the first direction 408 toward the arms of the header to enable the locking mechanism 400 to maintain the locked position. In certain embodiments, the biasing elements 412 may be coupled to the frame of the header. As illustrated, each biasing element 412 is a bi-directional torsion spring. In certain embodiments, the biasing elements 412 may be a leaf spring, another type of biasing element, or a combination thereof.

As described in greater detail below, the locking mechanism 400 is configured to selectively transition from the unlocked position to the locked position, and vice versa. As illustrated, the locking mechanism 400 includes a motor 420 and a handle 422. The motor 420 may be coupled to the frame of the header and may be controlled by the operator from the cab of the harvester. For example, the operator may provide an input to cause the motor 420 to transition the locking mechanism 400 from the unlocked position to the locked position. In response, the motor 420 may rotate the rod 402 in the first direction 408 to cause each hook 404 to engage a respective arm of the header. As each hook 404 engages the respective arm, the hook 404 substantially blocks rotation of the respective arm about the pivot joint. The portion of the cutter bar assembly coupled to the respective arm is blocked from flexing. The biasing elements 412 are configured to urge the hooks 404 toward the arms to enable the hooks 404 to engage the arms and remain engaged with the arms to maintain the cutter bar assembly in the substantially rigid configuration. In certain embodiments, the motor 420 may hold the locking mechanism in the locked position. Further, in some embodiments, the motor 420 may be an actuator and linkage coupled to the rod 402 and configured to transition the locking mechanism 400 from the locked position to the unlocked position, and vice versa.

The handle 422 enables the operator to rotate the rod 402 locally at the header. The operator may be positioned adjacent to the locking mechanism 400 and may rotate the rod 402 via the handle 422. The rotation of the rod 402 may transition the locking mechanism 400 between the locked position and the unlocked position. For example, the operator may rotate the rod 402, via the handle 422, in the first direction 408 to transition the locking mechanism from the unlocked position to the locked position. In certain embodiments, the motor 420 and/or the handle 422 may include a spring (e.g., a torsion spring) that could bias the locking mechanism generally in the first direction 408. For example, the spring(s) of the motor 420 and/or the handle 422 may provide the biasing force in addition to, or in place of, the biasing force of the biasing elements 412.

The rod 402 may rotate in the second direction 410 to cause each hook 404 to disengage the respective arm of the header. Once each hook 404 is disengaged from the respective arm, the respective arm may rotate about the pivot joint. The portion of the cutter bar assembly coupled to the respective arm may then flex. For example, the motor 420 may rotate the rod 402 in the second direction 410 to transition the locking mechanism 400 from the locked position to the unlocked position. Additionally, the operator may rotate the rod 402, via the handle 422, in the second direction 410 to transition the locking mechanism 400 from the locked position to the unlocked position. In certain embodiments, either the motor 420 or the handle 422 may be omitted from the locking mechanism 400.

As illustrated, the locking mechanism 400 includes a latching mechanism 424 that may be coupled to the header. The latching mechanism 424 is configured to engage the rod 402, the hooks 404, or a combination thereof, to hold the locking mechanism 400 in the unlocked position. For example, after the locking mechanism 400 is transitioned to the unlocked position (e.g., the rod 402 is rotated in the direction 410 and the hooks 404 disengage from the arms of the header), the latching mechanism 424 may engage the rod 402, the hooks 404, or the combination thereof, to hold the locking mechanism 400 in the unlocked position. The latching mechanism 424 may automatically engage the other portions (e.g., the rod 402 and the hooks 404) of the locking mechanism 400 as the rod 402 rotates in the direction 410. To transition the locking mechanism 400 from the unlocked position to the locked position, the latching mechanism 400 may disengage the other portions of the locking mechanism 400. After disengaging the latching mechanism 424, the biasing elements 412 may urge the locking mechanism 400 toward the locked position, and/or the motor 420 or the handle 422 may rotate the rod 402 and transition the locking mechanism 400 to the locked position. The operator may remotely disengage the latching mechanism 424 from the cab and/or may locally disengage the latching mechanism 424 from a position adjacent to the header.

As illustrated, each hook 404 includes a straight portion 430 and a curved portion 432. The straight portion 430 is coupled to the rod 402 and to the curved portion 432. The curved portion 432 includes a top surface 434 and a bottom surface 436. The bottom surface 436 of the curved portion 432 is configured to engage the second end of a respective arm of the header and to block rotation of the respective arm. For example, after the hook 404 engages the second end, the second end applies a force generally upwardly toward the bottom surface 436. The curved portion 432 contacts the second end and blocks the second end of the arm from rotating upwardly. Because a weight of the respective lateral belt, the cutter bar assembly, and the arm on the side of the pivot joint adjacent to the cutter bar assembly (e.g., toward the first end of the arm) is significantly greater than a weight of the arm on the side of the pivot joint adjacent to the locking mechanism 400 (e.g., toward the second end of the arm), the second end is naturally biased upwardly toward the hook 404. As such, the hook 404 blocks rotation of the arm.

In certain embodiments, the curved portion 432 may include a cam edge along the top surface 434 of the curved portion 432. After the locking mechanism 400 transitions to the locked position, the hook 404 may initially be disposed generally below the arm. The arm may rotate downward (e.g., the second end of the arm may rotate generally downward) and may engage the cam edge along the top surface 434. The arm may force the hook 404 and the rod 402 to rotate in the second direction 410 as the second end of the arm moves generally downward. Then, the arm may move below the curved portion 432 and the rod 402 and the hook 404 may rotate back in the first direction 408 such that the arm is disposed below the curved portion 432, and the arm contacts the bottom surface 436.

In certain embodiments, the hooks disposed along the lateral axis of the locking mechanism may be springs (e.g., torsion springs, spring steel, leaf springs, etc.). For example, the springs may be located at the approximate positions of the hooks 404 along the rod 402 in the illustrated embodiment. Each spring may be rigidly coupled to the rod at ends of the spring and configured to flex and rotate generally at a middle portion of the spring. Further, each spring may include a hook, similar the hook 404, that extends from the rod and that is configured to engage a respective arm of the header. Each spring may independently rotate relative to the rod as the respective arm moves to engage and/or disengage the spring. As such, the respective arms may be aligned differently along the header as each spring engages each respective arm. For example, the locking mechanism may transition to the locked position, and each spring may independently engage each respective arm to hold the cutter bar assembly in the substantially rigid configuration.

In certain embodiments, the locking mechanism may include multiple rods, with each rod coupled to a particular number of hooks (e.g., one hook, two hooks, three hooks, etc.). Each rod may independently rotate to engage respective arms of the header. For example, each rod may be coupled to a single hook such that each rod rotates independently to enable the hook to engage and disengage the respective arm of the header.

As described below, the hooks of the locking mechanism 400 may include alternative embodiments to block rotation of the arms. For example, each hook may include a first cam edge and a second cam edge. An opening may be located between the first cam edge and the second cam edge. As a respective arm of the header rotates, a pin of the arm may move along the first cam edge or the second cam edge and may engage the opening. After engaging the opening, the hook may block the arm from rotating.

Figure 6:
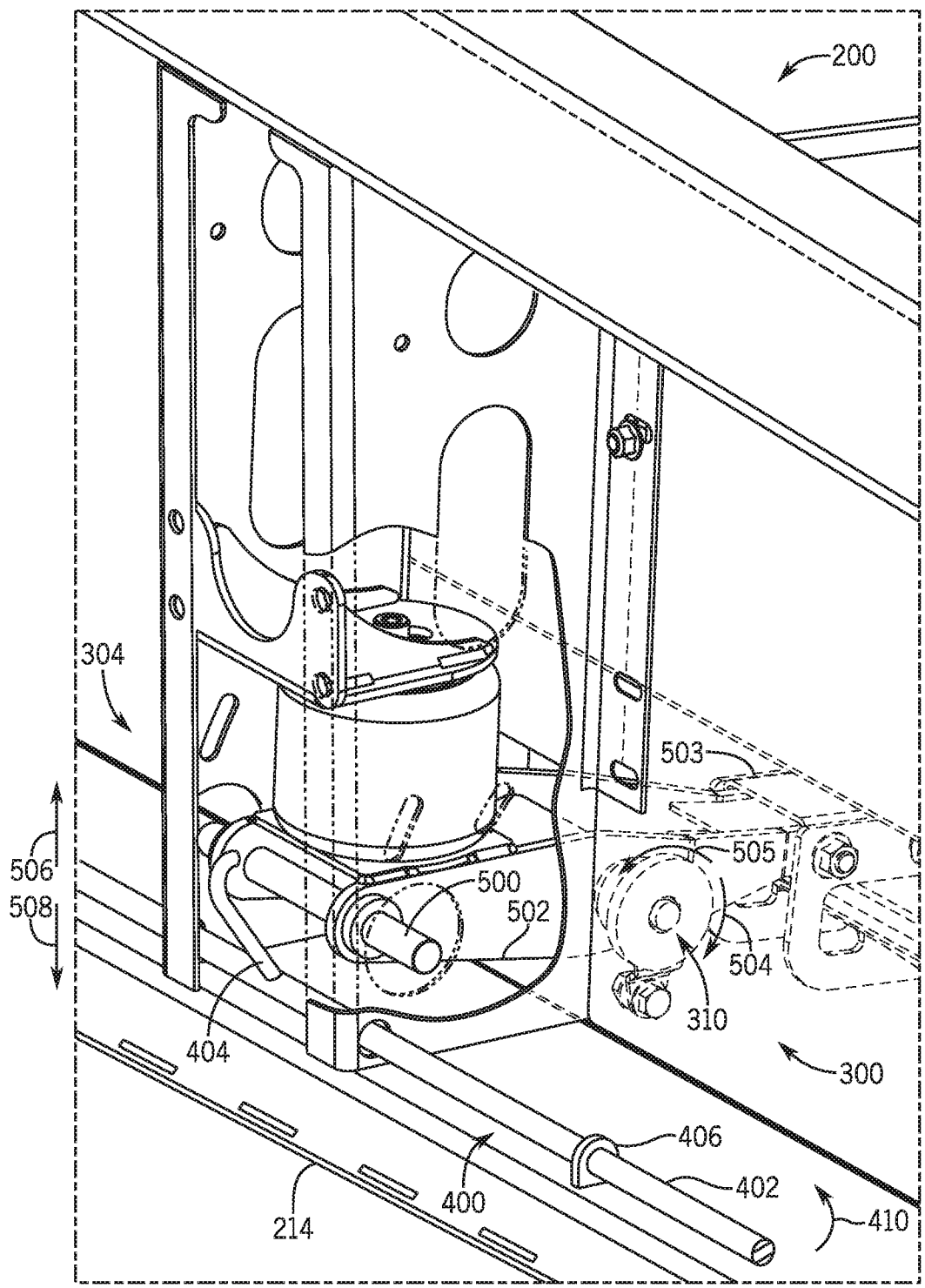
FIG. 6 is a rear perspective view of a portion of the header of FIG. 2, in which the locking mechanism is in an unlocked position.

FIG. 6 is a rear perspective view of a portion of the header 200 of FIG. 3, in which the locking mechanism 400 is in an unlocked position. As illustrated, the locking mechanism 400 is mounted to the frame 214 via the mounting brackets 406. The rod 402 is rotated in the second direction 410 away from the arm 300 such that the hooks 404 are disengaged from the arm 300. As illustrated, the arm 300 includes a pin 500 and a forked member 502 at the second end 304 of the arm 300. The pin 500 is rigidly coupled to the forked member 502, and the forked member 502 is rigidly coupled to an arm bar 503 of the arm 300.

As described herein, the arm 300 is configured to rotate about the pivot joint 310 in a first rotational direction 504 and in a second rotational direction 505. As the arm 300 rotates about the pivot joint 310, the second end 304 of the arm 300 moves upwardly in an upward direction 506 and downwardly in a downward direction 508. Additionally, as the arm 300 rotates, the cutter bar assembly coupled to the first end of the arm 300 flexes. For example, as the second end 304 of the arm 300 moves upwardly in the upward direction 506 (e.g., the arm 300 rotates in the first rotational direction 504), the first end of the arm 300 and the portion of the cutter bar assembly coupled to the arm 300 move downwardly. As the second end 304 of the arm 300 moves downwardly in the downward direction 508 (e.g., the arm 300 rotates in the second rotational direction 505), the first end of the arm 300 and the portion of the cutter bar assembly coupled to the arm 300 move upwardly. The hook 404 of the locking mechanism 400 is configured to engage the pin 500 to block rotation of the arm 300 about the pivot joint 310 and to hold the cutter bar assembly in the substantially rigid configuration. However, in the illustrated embodiment, the hook is disengaged from the pin 500. As such, the arm 300 may rotate and the cutter bar assembly may flex. The latching mechanism of the locking mechanism 400 is configured to maintain the locking mechanism 400 in the unlocked position.

Figure 7:
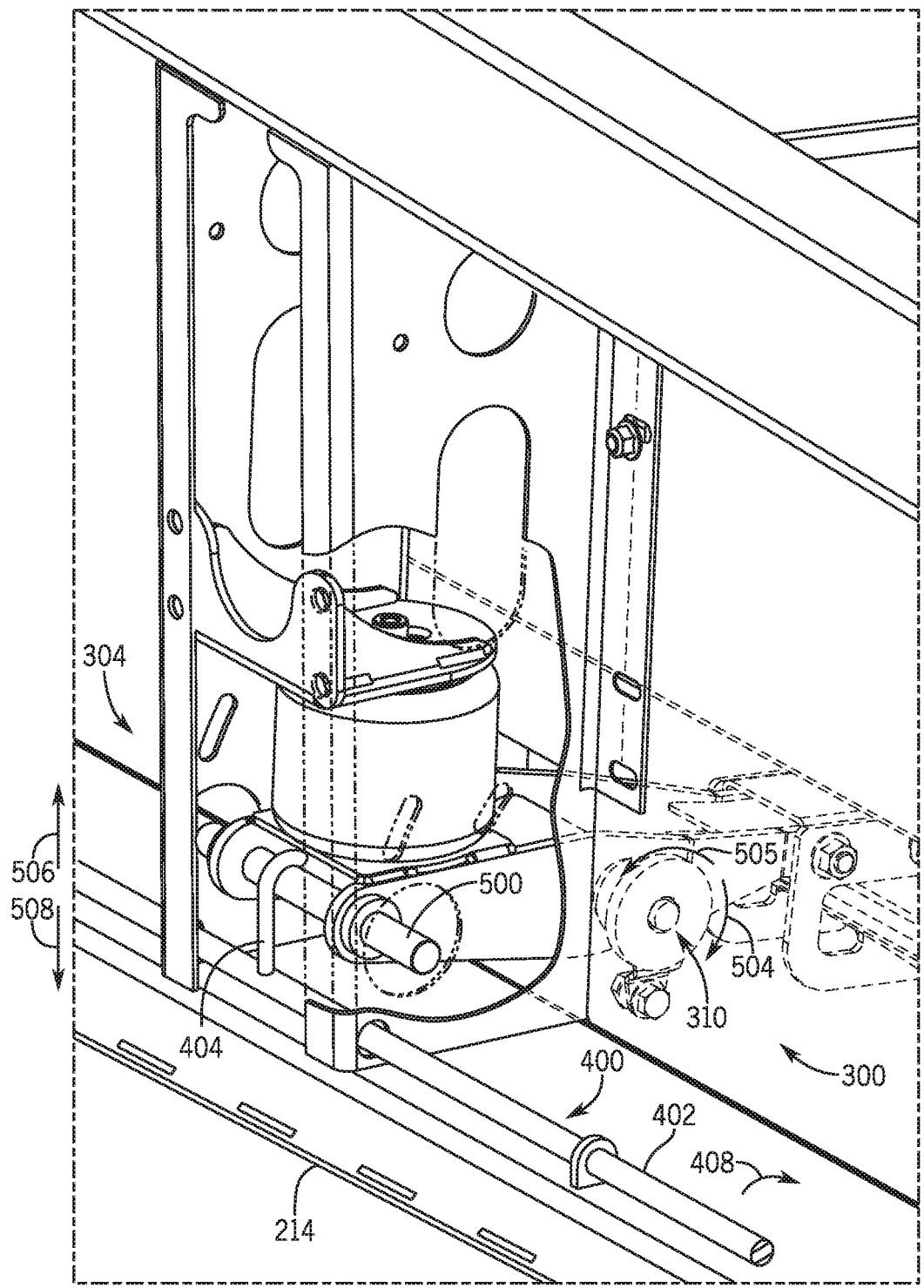
FIG. 7 is a rear perspective view of a portion of the header of FIG. 2, in which the locking mechanism is in a locked position.

FIG. 7 is a rear perspective view of a portion of the header 200 of FIG. 2, in which the locking mechanism 400 is in a locked position. As illustrated, the rod 402 is rotated in the first direction 408 toward the arm 300 such that the hook 404 is engaged with the arm 300 (e.g., the hook 404 is engaged with the pin 500 of the arm 300). The arm 300 is blocked from rotating about the pivot joint 310 in the first rotational direction 504 such that the second end 304 of the arm 300 is blocked from moving upwardly in the upward direction 502. Additionally, because the weight of the respective lateral belt, the cutter bar assembly, and the arm 300 on the side of the pivot joint 310 adjacent to the cutter bar assembly (e.g., toward the first end of the arm 300) is significantly greater than the weight of the arm 300 on the side of the pivot joint 310 adjacent to the locking mechanism 400 (e.g., toward the second end 304 of the arm 300), the second end 304 is naturally biased upwardly in the upward direction 506. As such, the pin 500 is biased upwardly against the hook 404, and the hook 404 blocks the arm 300 from rotating further in the upward direction 506. Accordingly, the locking mechanism 400 blocks rotation of the arm 300 in the illustrated embodiment. The cutter bar assembly coupled to the arm 300 is rigidly held in place and is blocked from flexing, thereby placing the cutter bar assembly in the substantially rigid configuration.

When the flexible configuration of the cutter bar assembly is desired, the operator may transition the locking mechanism 400 from the illustrated locked position to the unlocked position of FIG. 6. The rod 402 may rotate to disengage the hooks 404 from the arms 300, and the cutter bar assembly may return to the flexible configuration.

In certain embodiments, the header 200 may include a first stop and a second stop disposed generally above and generally below the pin 500, respectively. The first stop and the second stop may limit a range of motion of the pin 500 as the arm 300 rotates. For example, as the arm 300 rotates in the first rotational direction 504, the pin 500 may contact the first stop and further rotation of the arm 300 in the first rotational direction 504 may be blocked. As the arm 300 rotates in the second rotational direction 505, the pin 500 may contact the second stop and further rotation of the arm 300 in the second rotational direction 505 may be blocked. In some embodiments, the locking mechanism 400 may transition to the locked position while the pin 500 is in contact with the second stop. In such embodiments, the locking mechanism 400 would block rotation of the arm 300 in the first rotational direction 504, and the second stop would block rotation of the arm 300 in the second rotational direction 505.

Figure 8A:
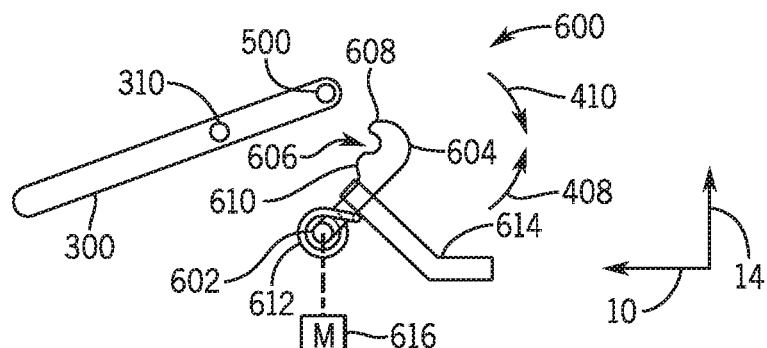
FIG. 8A is a side view of an arm of the header of FIG. 2 and an embodiment of a locking mechanism in an unlocked position.

FIG. 8A is a side view of the arm 300 of FIG. 3 and an embodiment of a locking mechanism 600 in an unlocked position. As illustrated, the locking mechanism 600 includes a rod 602 and a hook 604 coupled to the rod 602. The hook 604 includes an opening 606, a first cam edge 608, and a second cam edge 610. The opening 606 is formed between the first cam edge 608 and the second cam edge 610. The locking mechanism 600 is configured to transition from an unlocked position to a locked position, and vice versa. In the locked position, the hook 604 is configured to engage the pin 500 of the arm 300 at the opening 606. For example, once rotated to the locked position, the hook 604 may engage the pin 500 to block the arm 300 from rotating about the pivot joint 310.

As illustrated, the locking mechanism 600 includes a biasing element 612, a latching mechanism 614, and a motor 616. The biasing element 612 is configured to bias the rod 602 in the first direction 408 toward the arm 300. The latching mechanism 614 is configured to secure the hook 604 while the locking mechanism 600 is in the unlocked position. The motor 616 is configured to rotate the rod 602 in the first direction 408 and in the second direction 410. As illustrated, the rod 602 and the hook 604 are rotated backward in the second direction 610, and the hook 604 is secured by the latching mechanism 614 to maintain the locking mechanism 600 in the unlocked position.

Figure 8B:
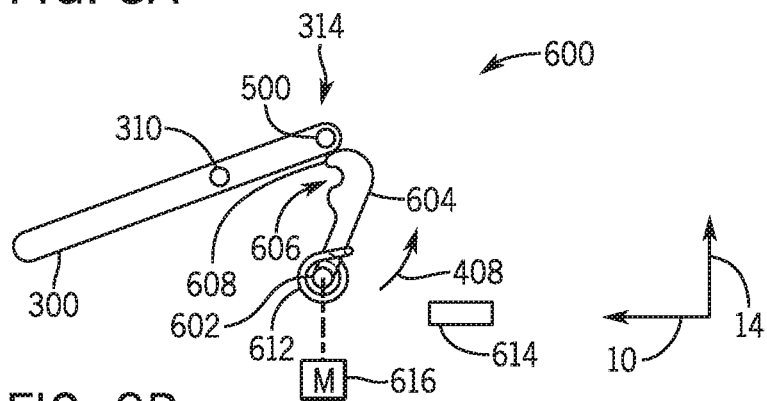
FIG. 8B is a side view of the locking mechanism of FIG. 8A in a forward position disengaged from the arm.

FIG. 8B is a side view of the locking mechanism 600 of FIG. 8A in a forward position disengaged from the arm 300. As illustrated, the rod 602 is rotated forward in the direction 408. The hook 604 is rotated to be disposed generally below the pin 500 along the vertical axis 14. The latching mechanism 614 is disengaged from the hook 604, and the biasing element 612 has urged the rod 602 forward in the first direction 408. The arm 300 may rotate about the pivot joint 310 such that the second end 304 of the arm 300 lowers toward the hook 604. The pin 500 may move along the first cam edge 608 and may drive the hook 604 backward opposite the direction 408. The pin 500 may then enter the opening 606.

Figure 8C:
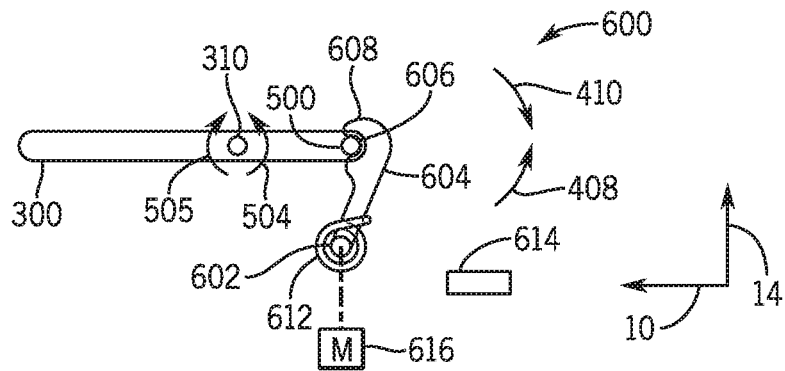
FIG. 8C is a side view of the locking mechanism of FIG. 8A in a locked position engaged with the arm.

FIG. 8C is a side view of the locking mechanism 600 of FIG. 8A in a locked position engaged with the arm 300. As illustrated, the rod 602 is rotated forward in the direction 408, and the hook 604 is engaged with the pin 500. As such, the arm 300 is blocked from rotating about the pivot joint 310, and the locking mechanism 600 is in the locked position. The biasing element 612 of the locking mechanism 600 urges the rod 602 and the hook 604 toward the pin 500 to maintain the locked position. To return the locking mechanism 600 to the unlocked position, the motor 616 of the locking mechanism 600 may rotate the rod 602 backwardly in the second direction 410 to the unlocked position of FIG. 8A.

The arm 300 may rotate about the pivot joint 310 as the header is raised and lowered. For example, the operator of the header may raise and lower the header from the cab of the harvester. Raising the header away from a surface of a field may cause the arm 300 to rotate about the pivot joint 310 in the first rotational direction 504 such that the first end 302 of the arm 300 moves downwardly and the second end 304 of the arm 300 moves upwardly. Lowering the header onto the surface of the field may cause the arm 300 to rotate about the pivot joint 310 in the second rotational direction 505 such that the first end 302 moves upwardly and the second end 304 moves downwardly. For example, as the header is lowered, the second end 304 of the arm 300 moves downwardly and pushes the hook 604 backwardly in the second direction 610. Because the rod 602 is biased in the first direction 408, the hook 604 is urged forward to engage the pin 500 of the second end 304. As such, the locking mechanism may transition from the position illustrated in FIG. 8B to the position illustrated in FIG. 8C. Further, while positioned within the cab of the harvester, the operator may move the arm 300 to engage and disengage the hook 604 of the locking mechanism 600.

Figure 8D:
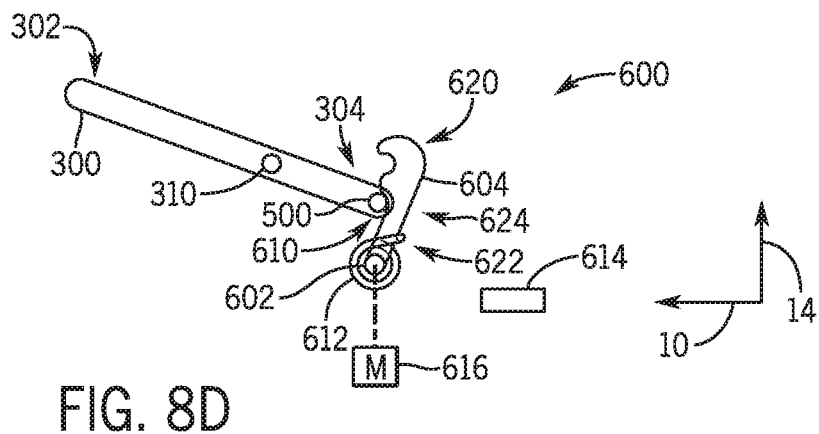
FIG. 8D is a side view of the locking mechanism of FIG. 8A in a forward position disengaged from the arm.

FIG. 8D is a side view of the locking mechanism 600 of FIG. 8A in a forward position disengaged from the arm 300. As illustrated, the rod 602 is rotated forward in the direction 408. The hook 604 is rotated such that the opening 606 of the hook 604 is disposed generally above the pin 500 along the vertical axis 14. The arm 300 may rotate about the pivot joint 310 such that the second end 304 of the arm 300 rises toward the opening 606. For example, as described above, the operator may raise the header to cause the second end 304 of the arm 300 to rise. The biasing element 612 causes the rod 602 and the hook 604 to be biased toward the arm 300 as the second end 304 of the arm 300 rises. As such, the pin 500 of the second end 304 moves along the second cam edge 610 and enters the opening 606. After the pin 500 enters the opening 606, the arm 300 may be blocked from rotating about the pivot joint 310.

As illustrated, the opening 606 is located generally toward a top portion 620 of the hook 604. The position of the opening 606 along the hook 604 controls the position of the cutter bar assembly in the substantially rigid configuration. For example, in certain embodiments, the opening 606 may be located at a bottom portion 622 of the hook 604. The location of the opening 606 at the bottom portion 622 may enable the second end 304 of the arm 300 to be generally lower than the first end 302 such that the cutter bar assembly is disposed generally higher while in the substantially rigid configuration, as compared to the embodiment with the opening 606 located at the top portion 620. Further, the opening 606 may be located at a middle portion 622 of the hook 604 to enable the cutter bar assembly in the substantially rigid configuration to be disposed at a middle position between the positions described above with the opening 606 disposed at the top portion 620 and the bottom portion 622.

As described herein, a locking mechanism for one or more arms of an agricultural header includes a rod and one or more hooks configured to engage the one or more arms. For example, the rod may rotate to drive the one or more hooks to engage the one or more arms and to transition the locking mechanism to a locked position. The one or more arms may be coupled to a cutter bar assembly of the agricultural header and may be configured to pivot. In the unlocked position, the one or more hooks are disengaged from the one or more arms, and the cutter bar assembly is configured to flex. In the locked position, the one or more hooks are engaged with the one or more arms, and the cutter bar assembly is held in a substantially rigid configuration.

The transition of the locking mechanism between the unlocked and locked positions may enable an operator of the agricultural header to change the cutter bar assembly between a flexible configuration and a substantially rigid configuration, respectively. For example, for some agricultural products and/or for some field conditions, the operator may desire a flexible cutter bar assembly that may generally flex with contours of the field. For other agricultural products and/or for other field conditions, the operator may desire a substantially rigid cutter bar assembly that remains substantially rigid as the agricultural header traverses the field. The locking mechanism enables the operator to easily transition between the flexible and the substantially rigid configurations. The operator may transition the cutter bar assembly between the flexible and the substantially rigid configurations while positioned within a cab of a harvester by rotating the rod of the locking mechanism and/or by raising and lowering the agricultural header. As a result, the locking mechanism described herein may increase an efficiency of operating the agricultural header and an efficiency of the harvesting process. The operator is not required to exit the cab and manually lock individual arms of the agricultural header to achieve a substantially rigid cutter bar assembly.

While only certain features of the present disclosure have been illustrated and described herein, many modifications and changes will occur to those skilled in the art. It is, therefore, to be understood that the appended claims are intended to cover all such modifications and changes as fall within the true spirit of the present disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A locking mechanism for an agricultural header, comprising:
a rod configured to extend laterally along the agricultural header, wherein the rod is configured to rotate in a first direction to transition the locking mechanism to a first position and rotate in a second direction, opposite the first direction, to transition the locking mechanism to a second position; and
a hook coupled to the rod and configured to engage a second end of a respective arm of the agricultural header, wherein a first end of the respective arm is configured to couple to a cutter bar assembly of the agricultural header, the respective arm is configured to rotate about a pivot joint positioned between the first end and the second end of the respective arm, the respective arm is configured to rotate relative to a frame of the agricultural header, the rod is configured to rotate in the first direction to engage the hook with the second end of the respective arm to block rotation of the respective arm, and the rod is configured to rotate in the second direction to disengage the hook from the second end of the respective arm to enable rotation of the respective arm.

2. The locking mechanism of claim 1, further comprising a latching mechanism configured to secure the locking mechanism in the second position.

3. The locking mechanism of claim 1, further comprising a motor coupled to the rod, wherein the motor is configured to rotate the rod in the second direction.

4. The locking mechanism of claim 1, further comprising a second hook coupled to the rod and configured to engage a second respective arm of the agricultural header.

5. The locking mechanism of claim 1, further comprising a biasing assembly configured to urge the hook toward the respective arm in the first direction.

6. The locking mechanism of claim 5, wherein the biasing assembly comprises at least one spring.

7. The locking mechanism of claim 6, wherein the at least one spring comprises a first spring coupled to a first end of the rod and a second spring coupled to a second end of the rod.

8. An agricultural header, comprising:
a frame;
an arm pivotally coupled to the frame, wherein the arm is configured to rotate about a pivot joint relative to the frame, and the arm is configured to support a cutter bar assembly; and
a locking mechanism configured to selectively block rotation of the arm about the pivot joint, wherein the locking mechanism comprises:
a rod configured to extend laterally along the agricultural header, wherein the rod is configured to rotate in a first direction to transition the locking mechanism to a first position and rotate in a second direction, opposite the first direction, to transition the locking mechanism to a second position;
a hook coupled to the rod and configured to engage the arm of the agricultural header, wherein the rod is configured to rotate in the first direction to engage the hook with the arm to block rotation of the arm, and the rod is configured to rotate in the second direction to disengage the hook from the arm to enable rotation of the arm; and
a biasing assembly configured to urge the hook toward the arm in the first direction, wherein the biasing assembly comprises at least one spring, and the at least one spring is disposed along a length of the rod.

9. The agricultural header of claim 8, further comprising a latching mechanism configured to secure the rod, the hook, or both, in the second position.

10. The agricultural header of claim 8, further comprising a motor coupled to the rod, wherein the motor is configured to rotate the rod in the second direction.

11. The agricultural header of claim 8, wherein the hook comprises a spring.

12. The agricultural header of claim 8, wherein the arm comprises a first end coupled to the cutter bar assembly and a second end configured to engage the hook.

13. The agricultural header of claim 8, wherein the locking mechanism further comprises a handle configured to enable an operator to rotate the rod in the second direction.

14. An agricultural header, comprising:
a frame;
a cutter bar assembly;
an arm pivotally coupled to the frame, wherein the arm comprises a first end coupled to the cutter bar assembly and a second end, the arm is configured to rotate about a pivot joint relative to the frame, and the pivot joint is positioned between the first end and the second end of the arm; and
a locking mechanism configured to selectively block rotation of the arm about the pivot joint, wherein the locking mechanism comprises:
a rod configured to extend laterally along the agricultural header, wherein the rod is configured to rotate in a first direction to transition the locking mechanism to a first position and rotate in a second direction, opposite the first direction, to transition the locking mechanism to a second position; and a hook coupled to the rod and configured to engage the second end of the arm, wherein the rod is configured to rotate in the first direction to engage the hook with the second end of the arm to block rotation of the arm, and the rod is configured to rotate in the second direction to disengage the hook from the second end of the arm to enable rotation of the arm.

15. The agricultural header of claim 14, wherein the cutter bar assembly is configured to be substantially rigid while the locking mechanism is in the first position.

16. The agricultural header of claim 14, wherein the second end of the arm comprises a pin, and the hook is configured to engage the pin.

17. The agricultural header of claim 14, further comprising a biasing assembly configured to urge the hook toward the arm in the first direction.

18. The agricultural header of claim 17, wherein the biasing assembly comprises at least one spring, and the at least one spring is disposed along a length of the rod.

19. The locking mechanism of claim 6, wherein the at least one spring is disposed along a length of the rod.

20. The agricultural header of claim 12, wherein the pivot joint is positioned between the first end and the second end of the arm.

* * * * *